(12) United States Patent
Sugawara

(10) Patent No.: US 6,363,225 B1
(45) Date of Patent: Mar. 26, 2002

(54) OPTICAL SYSTEM FOR SHOOTING A THREE-DIMENSIONAL IMAGE AND THREE-DIMENSIONAL IMAGE SHOOTING APPARATUS USING THE OPTICAL SYSTEM

(75) Inventor: Saburo Sugawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,699

(22) Filed: Jul. 28, 2000

(30) Foreign Application Priority Data

Jul. 30, 1999 (JP) .......................................... 11-217269

(51) Int. Cl.$^7$ ........................ G03B 35/00; G03B 21/00; G02B 27/22; H04N 13/00; H04N 13/02
(52) U.S. Cl. .................... 396/331; 352/57; 396/327; 353/7; 359/462; 348/46; 348/49
(58) Field of Search ................... 352/57, 60; 396/324, 396/326, 331, 327; 353/7; 359/462, 464; 348/42, 46, 49

(56) References Cited

U.S. PATENT DOCUMENTS

| 5,134,524 A | 7/1992 | Hamano et al. ............ 359/687 |
| 5,247,393 A | 9/1993 | Sugawara ................... 359/690 |
| 5,257,134 A | 10/1993 | Sugawara ................... 359/679 |
| 5,303,088 A | 4/1994 | Sugawara ................... 359/753 |
| 5,341,243 A | 8/1994 | Okuyama et al. .......... 359/687 |
| 5,550,679 A | 8/1996 | Sugawara ................... 359/689 |
| 5,552,938 A | 9/1996 | Sugawara ................... 359/691 |
| 5,600,490 A | 2/1997 | Sugawara et al. .......... 359/690 |
| 5,684,635 A | 11/1997 | Sugawara ................... 359/643 |
| 5,701,475 A | 12/1997 | Sugawara ................... 359/644 |
| 5,757,553 A | 5/1998 | Sugawara ................... 359/643 |
| 5,781,349 A | 7/1998 | Sugawara ................... 359/691 |
| 5,835,133 A | * 11/1998 | Moreton et al. |
| 5,920,433 A | 7/1999 | Sugawara ................... 359/663 |
| 5,926,316 A | 7/1999 | Sugawara ................... 359/557 |
| 5,969,873 A | 10/1999 | Sugawara ................... 359/645 |
| 5,969,875 A | 10/1999 | Sugawara ................... 359/651 |
| 5,973,847 A | 10/1999 | Sugawara ................... 359/644 |
| 5,986,806 A | 11/1999 | Sugawara ................... 359/557 |
| 6,008,949 A | 12/1999 | Sugawara ................... 359/644 |

FOREIGN PATENT DOCUMENTS

JP         6-327036         11/1994

* cited by examiner

Primary Examiner—Christopher E. Mahoney
Assistant Examiner—Magda Cruz
(74) Attorney, Agent, or Firm—Fitzpatrick, Cella, Harper & Scinto

(57) ABSTRACT

An optical system for shooting a three-dimensional image and a three-dimensional image shooting apparatus using the optical system produces an image with a smaller amount of light leaked from the side to be cut off over an entire image frame when parallax images are obtained by employing a shutter in which the extinction ratio varies depending on an incident angle. The optical system includes a pair of front optical components each having negative optical power, an optical member for superimposing optical axes of the pair of front optical components with each other, a rear optical component disposed to have an optical axis aligned with the superimposed optical axes, and a shutter capable of independently controlling amounts of transmitted light incident upon the pair of front optical components from an object. The shutter is disposed between the pair of front optical components and the rear optical component. The optical system forms parallax images in a time series by alternately changing the amount of transmitted light incident upon the pair of front optical components from the object with the shutter.

11 Claims, 13 Drawing Sheets

FIG. I

OPTICAL SYSTEM FOR SHOOTING A THREE-DIMENSIONAL IMAGE AND THREE-DIMENSIONAL IMAGE SHOOTING APPARATUS USING THE OPTICAL SYSTEM

BACKGROUND OF THE INVENTION

1. Field of the Invention

The present invention relates to an optical system for shooting a three-dimensional image and a three-dimensional image shooting apparatus using the optical system, which are suitable for alternately introducing images having left and right parallaxes (parallax images) to one image pickup device in a time series by using a shutter means, thereby producing a three-dimensional image.

2. Description of the Related Art

A plurality of parallax images for the left and right eyes are necessary to observe a three-dimensional image. Heretofore, various optical apparatuses and optical systems for shooting a three-dimensional image have been proposed to provide a plurality of parallax images.

Of the proposed optical apparatuses and systems, a three-dimensional image shooting apparatus for alternately introducing images having left and right parallaxes to the same area of one image pickup device in a time series by using a liquid crystal shutter is proposed, for example, in Japanese Patent Laid-Open No. 06-327036.

The three-dimensional image shooting apparatus shown in FIG. 1 of Japanese Patent Laid-Open No. 06-327036 comprises two reflecting mirrors on each of left and right sides, a liquid crystal shutter capable of being driven in an area split manner, and a shooting lens. The liquid crystal shutter is arranged near the entrance pupil of the shooting lens on the side closer to a subject with respect to the shooting lens so that images having left and right parallaxes may alternately enter the one image pickup device.

The liquid crystal shutter used in the three-dimensional image shooting apparatus proposed in Japanese Patent Laid-Open No. 06-327036 generally has a characteristic that the extinction ratio deteriorate as shown in FIG. 4, by way of example, as the incident angle of a light beam deviates increasingly from a direction perpendicular to a polarizing plate.

FIG. 4 shows one example of actually measured values of the changes in the extinction ratio resulting when the incident angle is varied from 0 degree, at which the optical beam enters the liquid crystal shutter perpendicularly, to 20 degrees.

Here, the term "extinction ratio" means a ratio of the maximum value to a minimum value of transmittance of the liquid crystal shutter.

In FIG. 4, a solid line FLC represents an angle characteristic of the extinction ratio of a liquid crystal shutter employing a ferroelectric liquid crystal, and a dotted line TN represents an angle characteristic of the extinction ratio of a liquid crystal shutter employing a twisted nematic liquid crystal.

Generally, as shown in FIG. 4, the liquid crystal shutter employing a ferroelectric liquid crystal exhibits smaller changes of the extinction ratio depending on changes of the incident angle.

The characteristic of the liquid crystal shutter, shown in FIG. 4, raises the following problem. When the liquid crystal shutter is arranged on the side closer to a subject with respect to the shooting lens as with the above-described related art, the incident angle of a light beam entering the liquid crystal shutter is increased depending on the angle of view of the shooting lens. As a result, the greater the angle of view of the shooting lens used, the greater the amount of light leaked in peripheral portions of the image frame of the image pickup device when light is to be cut off.

Therefore, when images having left and right parallaxes are alternately introduced to enter one image pickup device in a time series as intended by the above conventional three-dimensional image shooting apparatus, an image on the side to be cut off is leaked in its peripheral portions. For example, when it is desired to input only a right-side image, peripheral portions of a left-side image appear faintly like a ghost image in overlapped relation to the right-side image, thus resulting in a very unsightly three-dimensional image.

Also, when a liquid crystal shutter is used as a light amount control means, light after passing the shutter is polarized. In the case of employing an image pickup device such as a CCD which takes in images periodically, therefore, the use of a low-pass filter utilizing double refraction weakens the low-pass effect to such an extent that monochromatic moiré and color moiré are produced. This has raised a problem of making a picked-up image unsightly.

Still another problem has been experienced in that, because the light received for shooting is also polarized by a polarizing plate of the liquid crystal shutter positioned on the side closer to a subject, the luster of the subject actually perceived by the naked eyes of a photographer is significantly different from the luster of a picked-up image of the subject.

SUMMARY OF THE INVENTION

A primary object of the present invention is to provide an optical system for shooting a three-dimensional image and a three-dimensional image shooting apparatus using the optical system, which can produce an image with a smaller amount of light leaked from the side to be cut off over an entire image frame when parallax images are obtained by employing a shutter, such as a liquid crystal shutter, in which an extinction ratio varies depending on the incident angle.

A secondary object of the present invention is to provide an optical system for shooting a three-dimensional image and a three-dimensional image shooting apparatus using the optical system, which can suppress the occurrence of monochromatic moiré and color moiré, and which enables a subject to have natural luster in its picked-up image.

To achieve the above objects, the optical system of the present invention has the following features.

The optical system comprises a pair of front optical components each having negative optical power; an optical member for superimposing optical axes of the pair of front optical components with each other; a rear optical component disposed to have an optical axis aligned with the superimposed optical axes; and a shutter capable of independently controlling the amounts of transmitted light incident upon the pair of front optical components from a object, the shutter being disposed between the pair of front optical components and the rear optical component. The optical system forms parallax images in a time series by alternately changing the amounts of transmitted light incident upon the pair of front optical components from the subject with the shutter.

Also, the three-dimensional image shooting apparatus of the present invention comprises the optical system of the present invention, and an image pickup device disposed on an image focused plane of the optical system.

Further objects, features and advantages of the present invention will become apparent from the following description of the preferred embodiments( with reference to the attached drawings).

DESCRIPTION OF THE PREFERRED EMBODIMENTS

Figure 1:
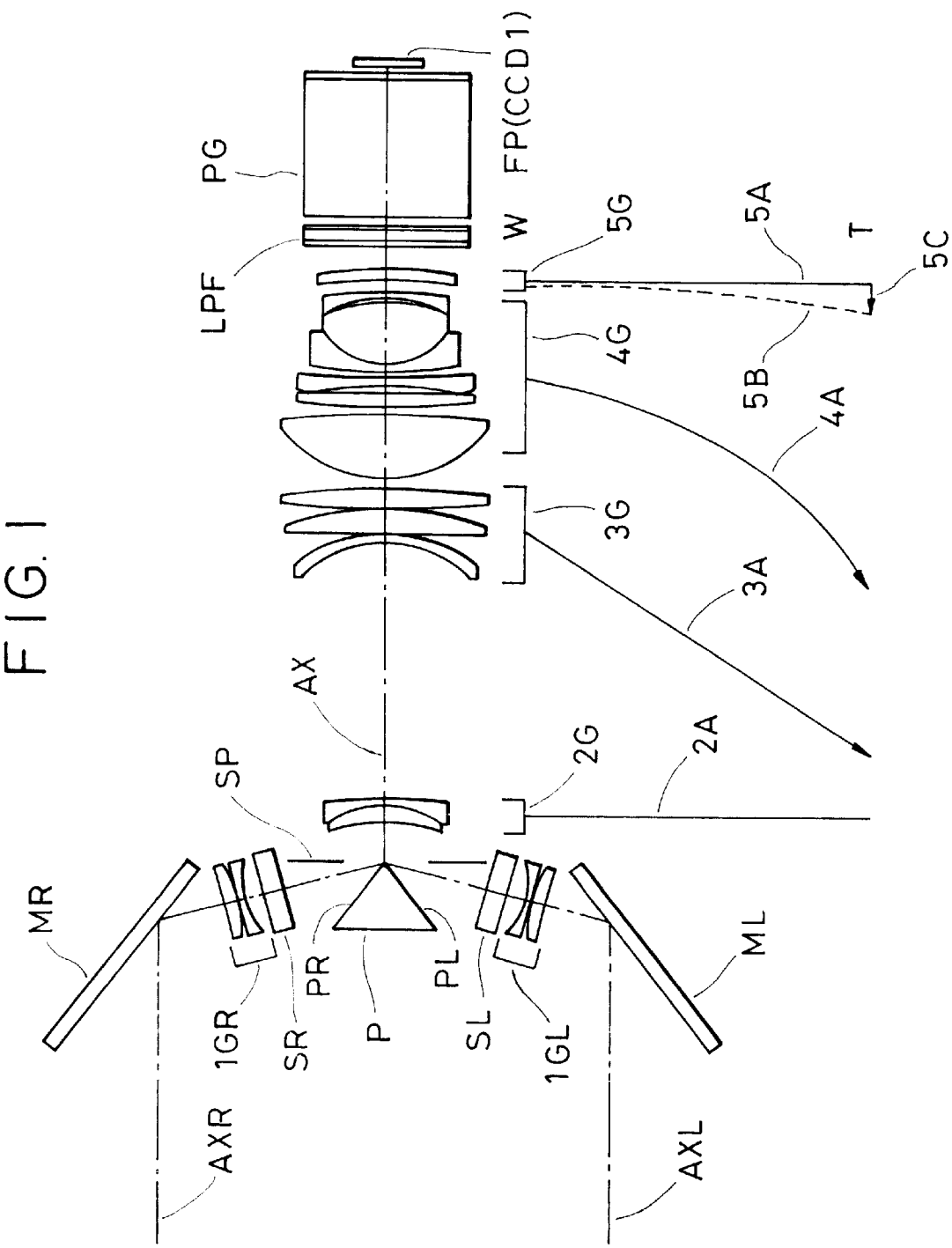
FIG. 1 is an optically depicted sectional view of a shooting optical system of Embodiment 1.

FIG. 1 is an optically-depicted sectional view of a three-dimensional image shooting apparatus using a three-dimensional image shooting optical system according to Embodiment 1 of the present invention. The three-dimensional image shooting optical system (referred to simply as "shooting optical system") shown in FIG. 1 is constructed to be able to produce two parallax images in a time series.

The shooting optical system of FIG. 1 comprises two left and right reflecting mirrors ML, MR for causing the deviation of, respectively, two left and right optical axes AXL, AXR inward, that are arranged substantially parallel to each other with a spacing almost equal to the eye-to-eye distance of human beings; two left and right first lens groups 1GL, 1GR being of the same construction and each having negative refractive power; two left and right liquid crystal shutters SL, SR serving as light amount control means; and a triangular-pillar prism (superimposing optical element) P that has surfaces PL, PR covered by reflecting coats and is disposed near the position of a stop of the shooting optical system for superimposing the two left and right optical axes AXL, AXR with each other. The shooting optical system further comprises a stop SP for adjusting an amount of light; a second lens group 2G held always stationary with respect to an image focused plane FP and having weak negative refractive power as a whole; a third lens group 3G that is movable on an optical axis from the image focused plane side to the subject side in the zooming operation ranging from the wide-angle end to the telephoto end and which has positive refractive power as a whole; a fourth lens group 4G which is movable on the optical axis for correcting the position of the image focused plane that is varied, depending on the zooming operation ranging from the wide-angle end to the telephoto end and that has positive refractive power as a whole; a fifth lens group 5G movable on the optical axis depending on changes of the distance to a subject and having positive refractive power as a whole; an optical low-pass filter (LPF); and a color separating prism PG.

The color separating prism PG serves to separate a light beam from the subject into light of three colors, i.e., red (R), green (G) and blue (B).

Accordingly, three image pickup devices (CCD) are disposed on the image focused plane FP corresponding to optical paths of the three colors, but only one of the three image pickup devices is shown in FIG. 1 and the others are omitted for the sake of brevity.

An image pickup device CCD1 has a light receiving surface aligned with the image focused plane FP. The image pickup device CCD1 represents an image pickup device, such as a CCD, which takes in images periodically.

By alternately opening and closing the two left and right liquid crystal shutters (light amount control means) SL, SR (i.e., by operating the liquid crystal shutters to be switched between a light transmitting state and a light nontransmitting state alternately), images having left and right parallaxes are alternately introduced to the image pickup device CCD1 in a time series.

Figure 2:
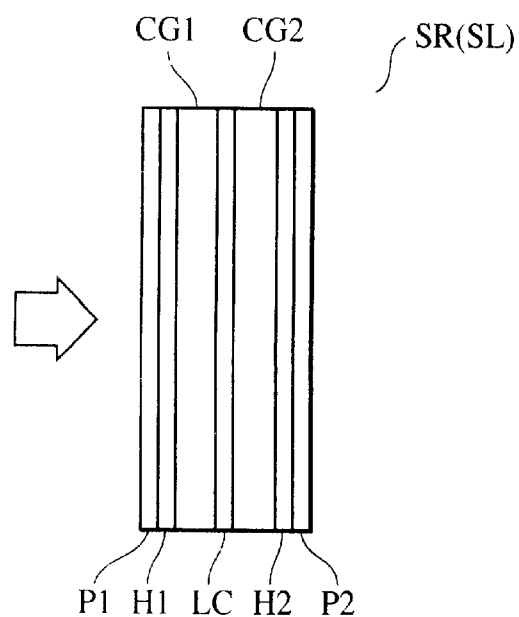
FIG. 2 is an optically depicted sectional view of one example of a liquid crystal shutter used in Embodiment 1.

FIG. 2 is a sectional view of a principal part of the liquid crystal shutter SL (SR) shown in FIG. 1. Each of the left and right liquid crystal shutters SL, SR comprises, as shown in FIG. 2, a ¼-wavelength plate P1, a polarizing plate H1, a cover glass CG1, a liquid crystal layer LC, a cover glass CG2, a polarizing plate H2, and a ¼-wavelength plate P2, which are arranged in this order from the side closer to the subject. Transparent electrodes are provided on a cover glass surface facing the liquid crystal layer LC.

With the left and right liquid crystal shutters SL, SR disposed respectively between the left and right first lens groups 1GL, 1GR each having negative refractive power and the triangular-pillar prism P, the incident angle of an off-axis primary light beam upon each of the left and right liquid crystal shutters SL, SR is made so small that the amount of light leaked over the entire light receiving surface of the image pickup device CCD1 can be reduced when each liquid crystal shutter is in the light cutoff state.

In this embodiment, the maximum incident angle of the light beam upon each liquid crystal shutter can be reduced down to a half or smaller than the case of arranging the liquid crystal shutters SL, SR on the side closer to the subject with respect to the first lens groups 1GL, 1GR.

Also, in this embodiment, since the first lens groups 1GL, 1GR, each having negative refractive power, are disposed on the side closer to the subject with respect to the triangular-pillar prism P which serves as an image superimposing means (superimposing optical element), the shooting optical system is constructed in a retro-focus arrangement. It is therefore easy to obtain a satisfactory long back focus and to realize the zooming operation at the wide-angle end. In addition, although the incident angle of the off-axis primary light beam upon each surface of the liquid crystal shutters SL, SR tends to increase in the zooming operation at the wide-angle end, the incident angle of the off-axis primary light beam upon the surface of the liquid crystal shutter positioned near the stop SP is reduced because the first lens groups 1GL, 1GR each have a negative refractive power.

Further, since the ¼-wavelength plates P1, P2 are arranged respectively on the subject side and the image pickup (device) side of each liquid crystal shutter SL (SR) that comprises the liquid crystal layer LC and the two polarizing plates H1, H2, it is possible to prevent not only changes in the luster of the subject due to polarization, but also the occurrence of moiré due to a reduction of the effect of the quartz low-pass filter LPF caused by polarization. As a result, a natural image can be produced.

With the ¼-wavelength plates P1, P2 arranged on both the subject side and the image pickup side of each liquid crystal shutter SL (SR), linearly polarized light passing the liquid crystal shutter SL (SR) becomes circularly polarized light on both the subject side and the image pickup side. This arrangement is therefore effective in reducing the influence of the subject having a polarization characteristic and in suppressing the reduction of the effect of the quartz low-pass filter LPF that is used to separate a light beam based on double refraction.

During the zooming operation ranging from the wide-angle end to the telephoto end, the third lens group 3G and the fourth lens group 4G are moved toward the subject side on the optical axis as indicated by loci 3A, 4A shown in FIG. 1 to perform zooming and correction of the image focused plane distorted with the zooming. The fifth lens group 5G is stationary relative to the image focused plane as indicated by a locus 5A when the distance to the subject is infinite, but it is forwarded toward the subject side, depending on the variations of the distance to the subject as indicated by a dotted locus 5B, for example, when the subject is in the close range, thereby performing correction (proper focusing) of the image focused plane corresponding to variations of the distance to the subject.

Arrow 5C represents a locus along which the fifth lens group 5G is forwarded when focusing of the subject is performed at the telephoto end from the infinite range to the close range. The first to fifth lens groups 1Gl (1GR) to 5G constitute the shooting optical system. The reflecting mirror ML (MR) and the first lens group 1Gl (1GR) constitute one subsystem of a front lens system, whereas the second to fifth lens group 2G to 5G constitute a rear lens system.

As shown in FIG. 1, the entrance pupil (stop) SP of the shooting optical system is disposed on the subject side within the shooting optical system, and the triangular-pillar prism P is arranged such that the images having left and right parallaxes (parallax images) are each introduced to the second lens group 2G through the entrance pupil SP.

More specifically, in this embodiment, the triangular-pillar prism (superimposing optical element) P is disposed at the stop SP so as to divide a stop aperture into two halves. Optical axes of one pair of the front lens systems each cross an optical axis of the rear lens system at a ridgeline of the triangular-pillar prism P including its apical angle. Then, by operating the left and right shutters SL, SR to transmit the light beam alternately, the left and right parallax images are obtained in a time series at the image pickup device disposed in the image focused plane FP.

With this embodiment thus constructed, the diameter of a front lens of the shooting optical system is reduced and broadening of the off-axis light beam on the subject side is suppressed. Accordingly, the two left and right reflecting mirrors ML, MR and the two left and right liquid crystal shutters SL, SR can be reduced in size, and hence a three-dimensional image shooting optical system having a smaller size as a whole is realized.

Particularly, in this embodiment, the shutters SL, SR are arranged between the reflecting mirrors ML, MR and the first lens groups 1GL, 1GR for a reduction in size of the shutters SL, SR. While liquid crystal shutters are used as the shutters SL, SR in this embodiment, mechanical shutters may be used instead.

The (apical) angle of the triangular-pillar prism P formed between the two reflecting surfaces PL, PR thereof is set to 75 degrees in this embodiment shown in FIG. 1, taking into account vignetting of an effective light beam by the stop SP and a size reduction of the reflecting mirror.

Also, the above construction of this embodiment is advantageous in that, since a single zooming optical system is provided, there occur neither an error in magnification between the left and right parallax images nor shifts the of optical axes during the zooming operation.

In this embodiment shown in FIG. 1, the fifth lens group performs the correction (proper focusing) of the position of the image focused plane corresponding to variations of the distance to the subject. However, any of other lens groups except for the first lens group can also be used to perform the correction (proper focusing) of the position of the image focused plane corresponding to variations of the distance to the subject.

For further adjustment of the light amount, in addition to the method of changing the aperture of the stop SP, a light-amount attenuating filter may be disposed between the first lens group and the reflecting mirror or between the first lens group and the superimposing prism P in such a way as to be able to advance and retreat depending on the brightness of the subject.

Further, parallax images may be obtained by providing the reflecting mirrors ML, MR in rotatable fashion, and changing the distance to a point, at which the left and right optical axes AXL, AXR cross each other on the subject side, depending on distance information measured by a range finder (not shown). This arrangement is effective in providing a three-dimensional image that is easier to view.

Moreover, the triangular-pillar prism P may be constructed by using two plane mirrors. Additionally, the reflecting mirrors ML, MR may be each constructed by a reflecting prism. This arrangement is effective to suppress broadening of the off-axis light beam and to realize a further reduction in size.

Figure 3:
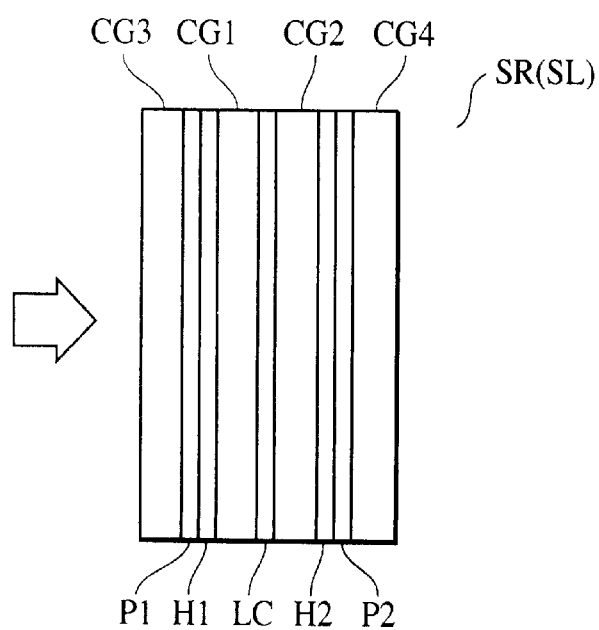
FIG. 3 is an optically depicted sectional view of another example of the liquid crystal shutter used in Embodiment 1.

FIG. 3 is a sectional view of a principal part of another example of the left and right liquid crystal shutters used in Embodiment 1 of the present invention.

The left and right liquid crystal shutters SL, SR of the another example each comprises, as shown in FIG. 3, a cover glass CG3, a ¼-wavelength plate P1, a polarizing plate H1, a cover glass CG1, a liquid crystal layer LC, a cover glass CG2, a polarizing plate H2, a b ¼-wavelength plate P2, and a cover glass CG4, which are arranged in this order from the side closer to the subject. Transparent electrodes are provided on a cover glass surface facing the liquid crystal layer LC.

With the cover glasses CG3, CG4 additionally disposed on both sides of the liquid crystal shutter shown in FIG. 2 to sandwich it therebetween, poor flatness of the ¼-wavelength plates P1 and P2 is improved by filling an adhesive between the ¼-wavelength plate P1 and the cover glass CG3 and between the ¼-wavelength plate P2 and the cover glass CG4, the adhesive having a refractive index close to those of materials of the cover glass and the ¼-wavelength plate.

Figure 5:
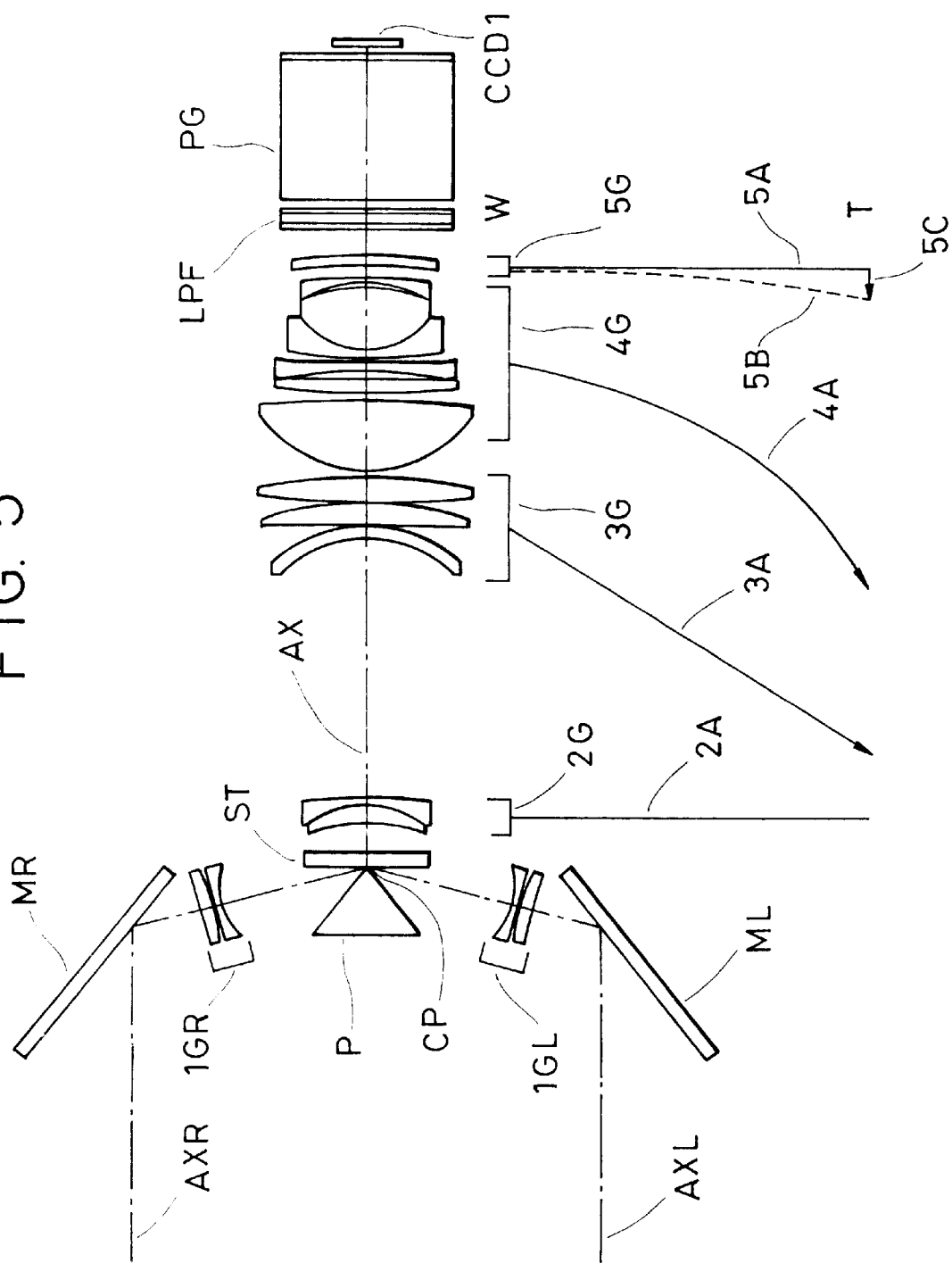
FIG. 5 is an optically depicted sectional view of a shooting optical system of Embodiment 2.

FIG. 5 is a sectional view of a shooting optical system of Embodiment 2 of the present invention. Embodiment 2 has the same construction as Embodiment 1 shown in FIG. 1 except that one liquid crystal shutter ST is disposed between a superimposing optical element P and a second lens group 2G instead of using the two left and right liquid crystal shutters SL, SR.

The shooting optical system of FIG. 5 comprises two left and right reflecting mirrors ML, MR for causing the deviation, respectively of two left and right optical axes AXL, AXR inward, which are arranged substantially parallel to each other with a spacing almost equal to the eye-to-eye distance of human beings; two left and right first lens groups 1GL, 1GR each having negative refractive power; a triangular-pillar prism P disposed near the position of a stop of the shooting optical system for superimposing the two left and right optical axes AXL, AXR with each other; and a liquid crystal shutter ST for adjusting an optical amount and switching over two left and right parallax images. The shooting optical system further comprises a second lens group 2G held always stationary with respect to an image focused plane (image pickup device CCD1) and having weak negative refractive power as a whole; a third lens group 3G that is movable on an optical axis from the image focused plane side to the subject side in the zooming operation ranging from the wide-angle end to the telephoto end and that has positive refractive power as a whole; a fourth lens group 4G that is movable on the optical axis for correcting the position of the image focused plane varied depending on the zooming operation ranging from the wide-angle end to the telephoto end and that has positive refractive power as a whole; a fifth lens group 5G movable on the optical axis depending on changes of the distance to a subject and having positive refractive power as a whole; an optical low-pass filter (LPF); a color separating prism PG; and an image pickup device CCD1 (having a light receiving surface aligned with the image focused plane). The image pickup device CCD1 represents an image pickup device, such as a CCD, which takes in images periodically.

Figure 8:
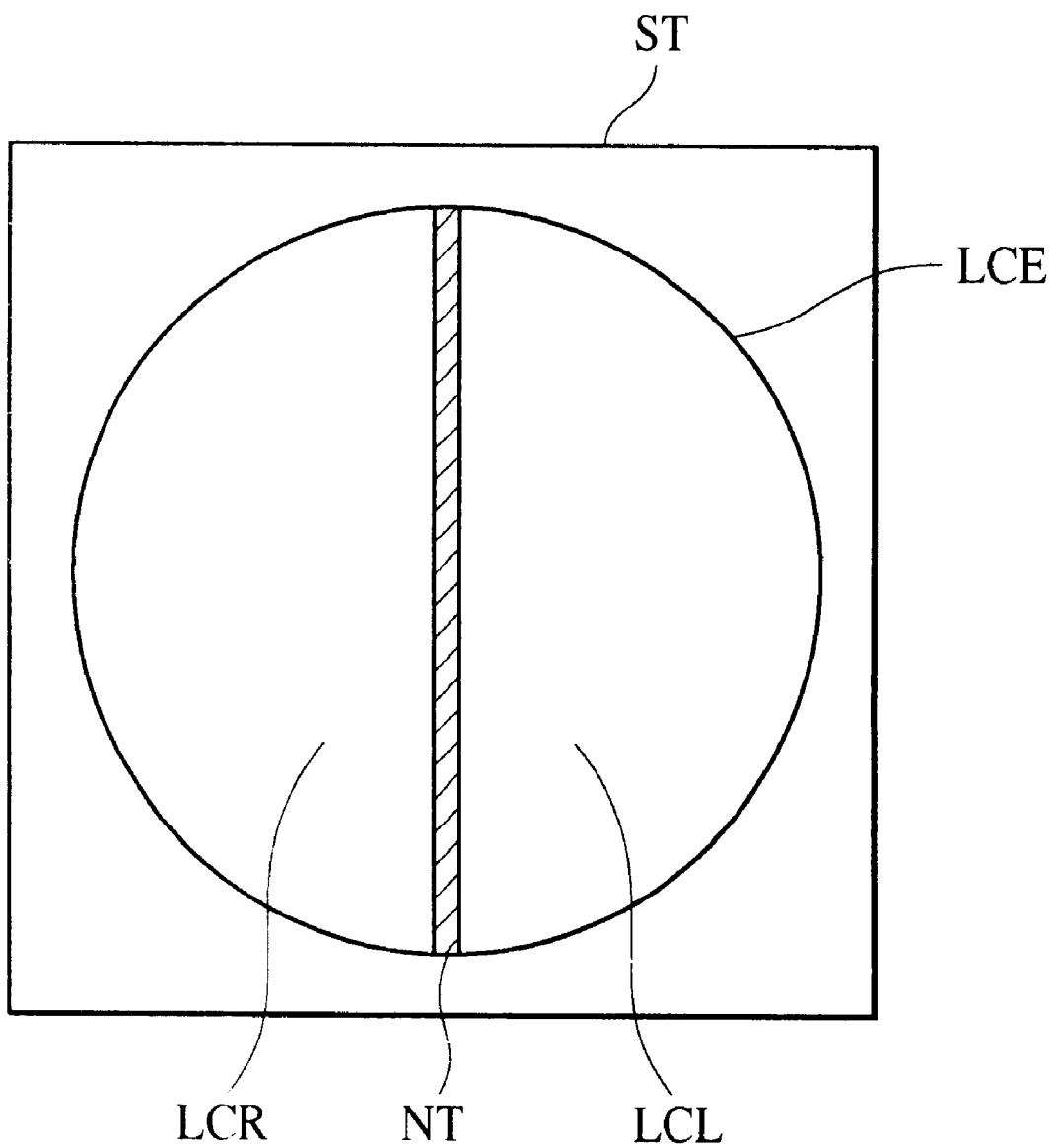
FIG. 8 is a front view of the liquid crystal shutter used in Embodiment 2.

In the liquid crystal shutter ST, as shown in a front view of FIG. 8, an overall driving region LCE of the liquid crystal shutter ST is divided into two left and right driving regions LCL, LCR each having a half area. The transmittances of the left and right driving regions LCL, LCR are alternately increased and decreased in a switching manner so that images having left and right parallaxes are alternately introduced to the image pickup device CCD1 in the time series.

In the embodiment shown in FIG. 5, a crossed point CP of the left and right optical axes is set to be slightly shifted from the liquid crystal layer of the liquid crystal shutter ST. As shown in FIG. 8, therefore, a non-transmitting area NT is produced between the left and right driving regions LCL, LCR of the liquid crystal shutter. It is hence possible to prevent light leakage from one channel to the other channel due to a shift of the optical path when light is to be cut off (i.e., a light leakage to the right-eye image when the left driving region LCL is in the light cutoff state, and a light leakage to the left-eye image when the right driving region LCR is in the light cutoff state).

When the liquid crystal shutter serves also to perform the function of a stop, the light amount may be controlled by setting the transmittance of the liquid crystal shutter in the open state to a certain level between the maximum value and the minimum value. Alternatively, similar control of the light amount can be effected by controlling periods of time during which the liquid crystal shutter is opened and closed.

Figure 6:
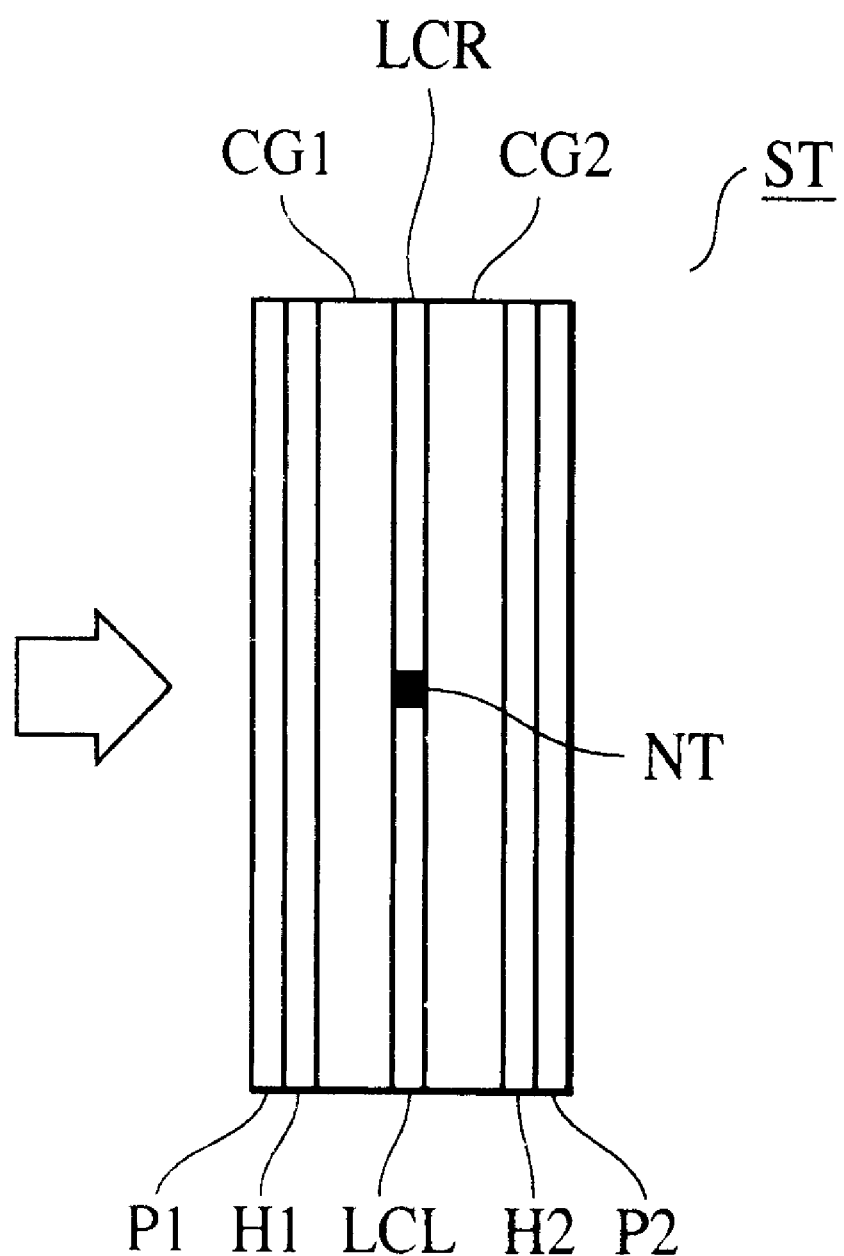
FIG. 6 is an optically depicted sectional view of one example of a liquid crystal shutter used in Embodiment 2.

More specifically, the liquid crystal shutter ST comprises, as shown in FIG. 6, a ¼-wavelength plate P1, a polarizing plate H1, a cover glass CG1, liquid crystal layers LCL and LCR, a cover glass CG2, a polarizing plate H2, and a ¼-wavelength plate P2, which are arranged in this order from the side closer to the subject. Transparent electrodes are provided on a cover glass surface facing the liquid crystal layer LCL (LCR).

With the liquid crystal shutter ST disposed between the triangular-pillar prism P and the second lens group 2G, the incident angle of an off-axis primary light beam upon the liquid crystal shutter ST is made so small that the amount of light leaked over the entire light receiving surface of the image pickup device CCD1 can be reduced when the driving region LCL (LCR) of the liquid crystal shutter is in the light cutoff state.

In this embodiment, the maximum incident angle of the light beam upon the liquid crystal shutter can be reduced down to a half or smaller than the case of arranging the liquid crystal shutter on the side closer to the subject with respect to the first lens group 1GL (1GR) shown in FIG. 1.

Further, since the ¼-wavelength plates P1, P2 are arranged respectively on the subject side and the image pickup (device) side of the liquid crystal shutter ST, which comprises the liquid crystal layer LCL (LCR) and the two polarizing plates H1, H2, it is possible to prevent not only changes in the luster of the subject due to polarization, but also the occurrence of moiré due to a reduction of the effect of the quartz low-pass filter LPF caused by polarization. As a result, a natural image can be taken.

With the ¼-wavelength plates arranged on both the sides of the liquid crystal shutter, linearly polarized light passing the liquid crystal shutter becomes circularly polarized light on both the subject side and the image pickup side. This arrangement is therefore effective in reducing the influence of the subject having a polarization characteristic and in suppressing the reduction of the effect of the quartz low-pass filter that is used to separate a light beam based on double refraction.

Embodiment 2 shown in FIG. 5 is the same as Embodiment 1 shown in FIG. 1 except for the construction and placement of the liquid crystal shutter, and performs the zooming and focusing operation in a similar way.

Figure 7:
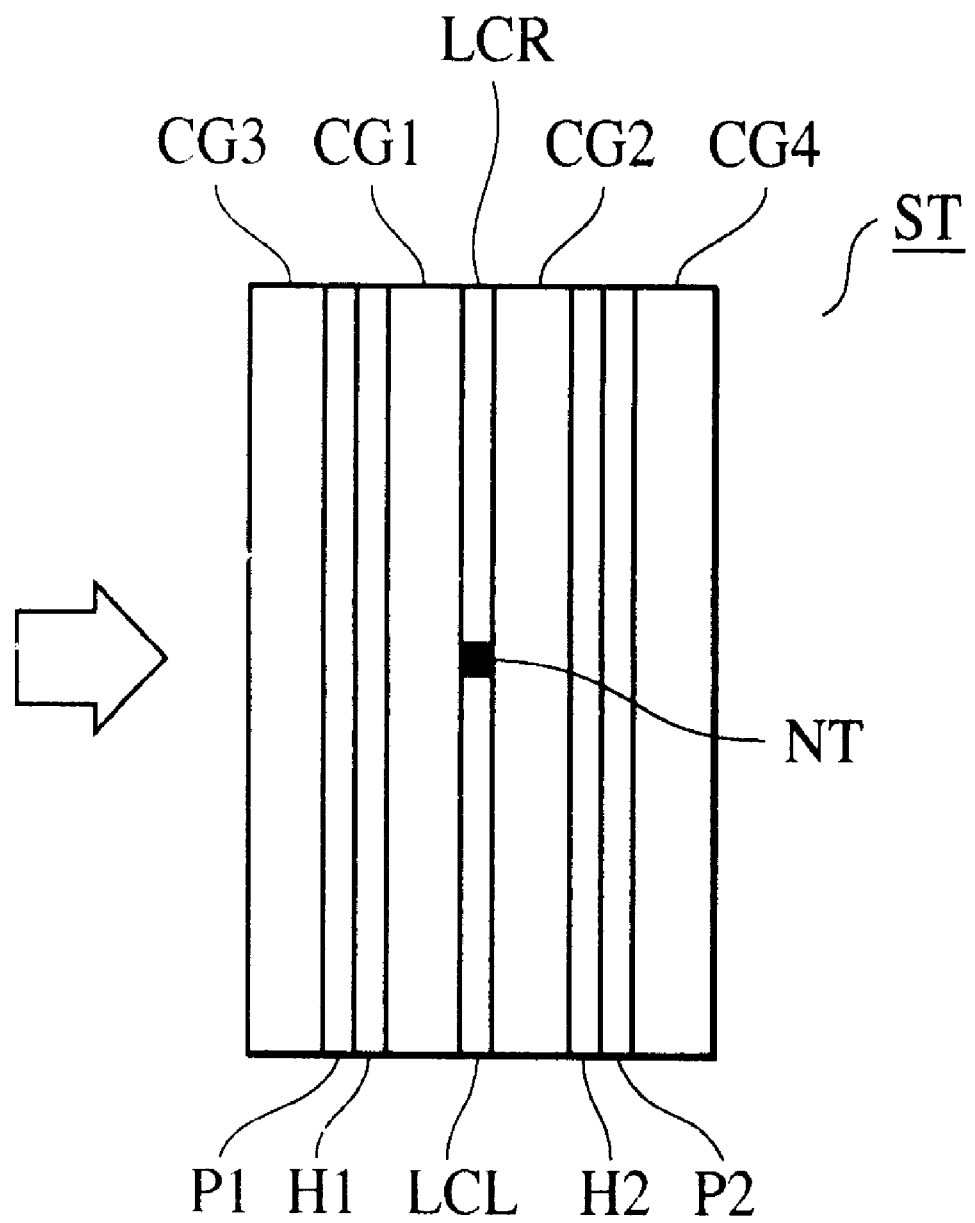
FIG. 7 is an optically depicted sectional view of another example of the liquid crystal shutter used in Embodiment 2.

FIG. 7 is a sectional view of a principal part of another example of the liquid crystal shutter ST used in Embodiment 2 of the present invention.

The liquid crystal shutter ST of the another example comprises, as shown in FIG. 7, a cover glass CG3, a ¼-wavelength plate P1, a polarizing plate HI, a cover glass CG1, liquid crystal layers LCL and LCR, a cover glass CG2, a polarizing plate H2, a ¼-wavelength plate P2, and a cover glass CG4, which are arranged in this order from the side closer to the subject. Transparent electrodes are provided on a cover glass surface facing the liquid crystal layer LCL (LCR).

With the cover glasses CG3, CG4 additionally disposed on both sides of the liquid crystal shutter shown in FIG. 6 to sandwich it therebetween, poor flatness of the ¼-wavelength plates P1 and P2 is improved by filling an adhesive between the ¼-wavelength plate P1 and the cover glass CG3 and between the ¼-wavelength plate P2 and the cover glass CG4, the adhesive having a refractive index close to those of materials of the cover glass and the ¼-wavelength plate.

With Embodiment 2 shown in FIG. 5, since the one liquid crystal shutter ST is used to switch over the images having left and right parallaxes and to control the light amount depending on changes in brightness of the subject, the overall apparatus construction is simplified.

Additionally, when it is desired to effect further adjustment of the light amount in Embodiment 2, a stop or an ND filter may be disposed between the triangular-pillar prism P and the liquid crystal shutter ST or between the liquid crystal shutter ST and the second lens group 2G.

Figure 9:
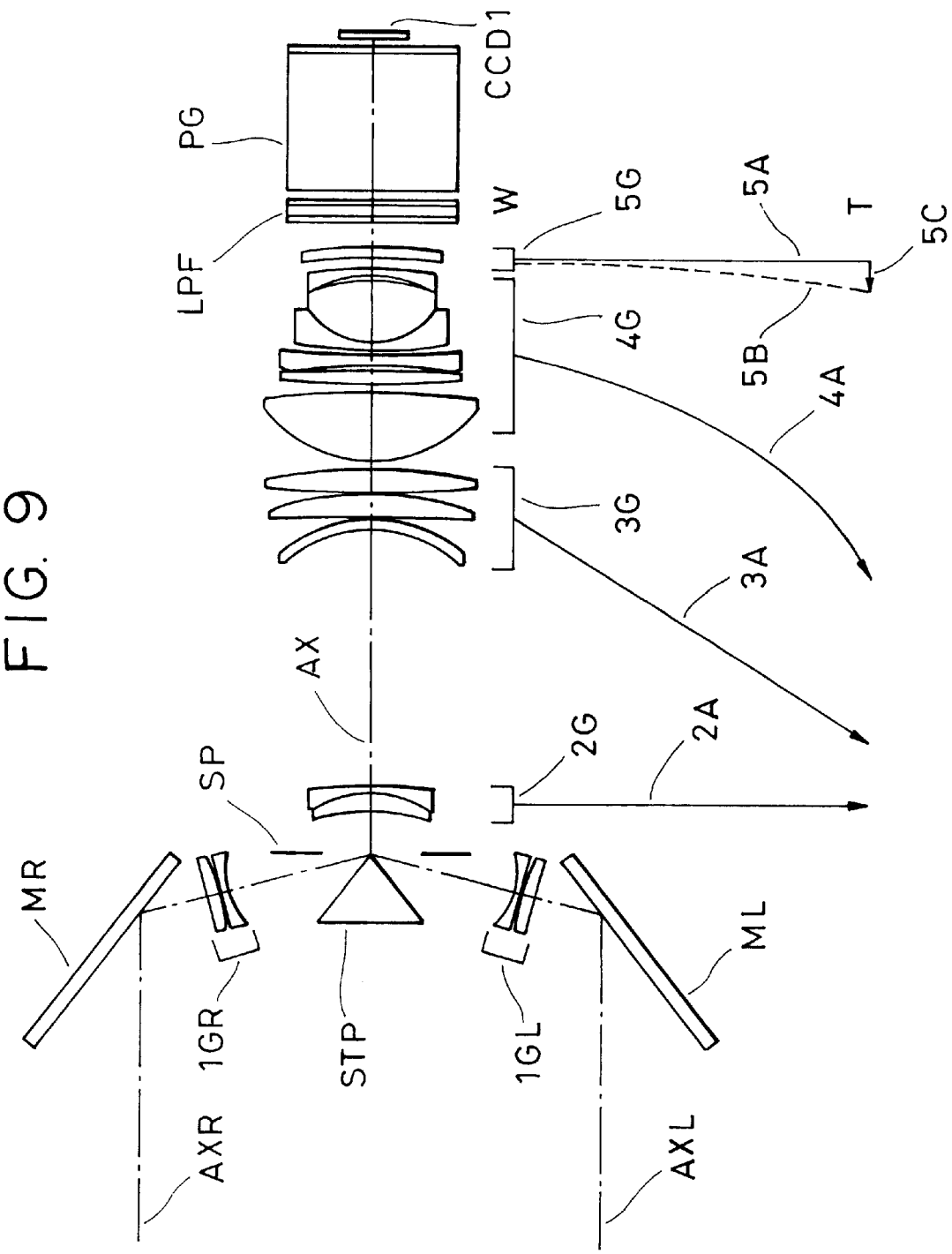
FIG. 9 is an optically depicted sectional view of a shooting optical system of Embodiment 3.

FIG. 9 is a sectional view of a shooting optical system of Embodiment 3 of the present invention. Embodiment 3 has the same construction as Embodiment 1 shown in FIG. 1 except that the two left and right liquid crystal shutters SL, SR are omitted and a superimposing optical element (triangularpillar prism) STP having a shutter function able to independently adjust the reflectances of left and right reflecting surfaces is employed instead of the liquid crystal shutters SL, SR.

The shooting optical system of FIG. 9 comprises two left and right reflecting mirrors ML, MR for causing the deviation of, respectively, two left and right optical axes AXL, AXR inward, which are arranged substantially parallel to each other with a spacing almost equal to the eye-to-eye distance of human beings; two left and right first lens groups 1GL, 1GR each having negative refractive power; and a triangular—pillar prism STP that has two left and right reflecting surfaces whose reflectance are able to change independently and that is disposed near the position of a stop SP of the shooting optical system for superimposing the two left and right optical axes AXL, AXR with each other. The shooting optical system further comprises a second lens group 2G held always stationary with respect to an image focused plane (image pickup device CCD1) and having weak negative refractive power as a whole; a third lens group 3G that is movable on an optical axis from the image focused plane side to the subject side in the zooming operation ranging from the wide-angle end to the telephoto end and that has positive refractive power as a whole; a fourth lens group 4G that is movable on the optical axis for correcting the position of the image focused plane varied depending on the zooming operation ranging from the wide-angle end to the telephoto end and that has positive refractive power as a whole; a fifth lens group 5G movable on the optical axis depending on changes of the distance to a subject and having positive refractive power as a whole; an optical low-pass filter (LPF); a color separating prism PG; and an image pickup device CCD1 (having a light receiving surface aligned with the image focused plane). The image pickup device CCD1 represents an image pickup device, such as a CCD, that takes in images periodically.

Figure 10:
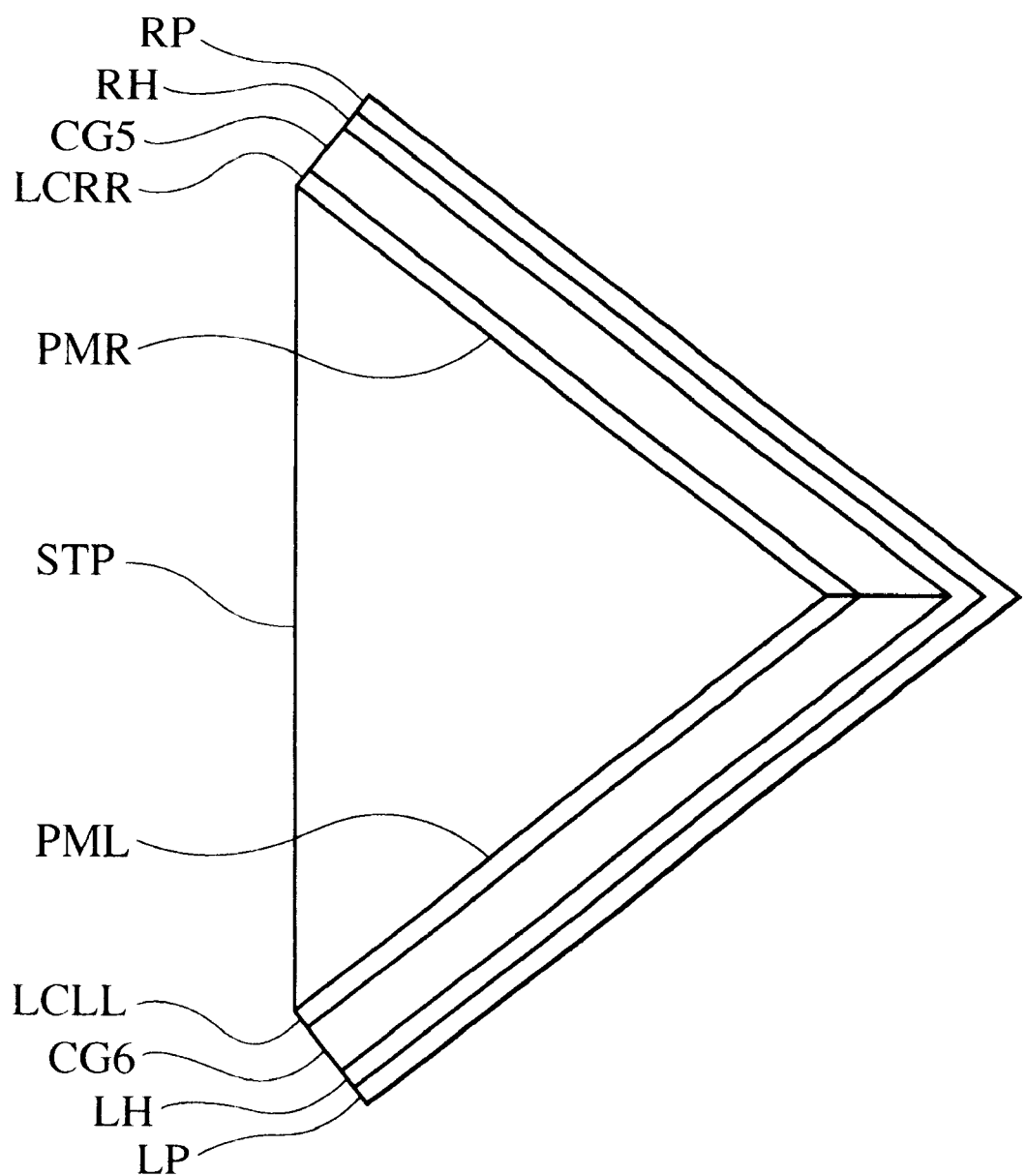
FIG. 10 is an optically depicted sectional view of a triangular—pillar prism serving also as a liquid crystal shutter used in Embodiment 3.

The triangular-pillar prism STP having the two left and right reflecting surfaces whose reflectances are variable includes, as shown in FIG. 10, a liquid crystal layer LCRR formed on a right-side reflecting surface PMR of the triangular-pillar prism STP; a cover glass CG5 covering the liquid crystal layer LCRR; a polarizing plate RH bonded onto the cover glass CG5; and a ¼-wavelength plate RP bonded onto the polarizing plate RH. The triangular-pillar prism STP further includes a liquid crystal layer LCLL formed on a left-side reflecting surface PML of the triangular-pillar prism STP; a cover glass CG6 covering the liquid crystal layer LCLL; a polarizing plate LH bonded onto the cover glass CG6; and a ¼-wavelength plate LP bonded onto the polarizing plate LH. Transparent electrodes are provided on a surface of the cover glass CG5 (CG6) facing the liquid crystal layer LCRR (LCLL). The reflecting surfaces PMR, PML of the triangular-pillar prism STP also serve themselves as electrodes.

The above elements LCLL, CG6, RH, and RP (LCRR, CG5, LH, and LP) cooperatively constitute a left (right) liquid crystal shutter.

The transmittances of the left and right liquid crystal shutter are alternately increased and decreased in a switching manner so that images having left and right parallaxes are alternately introduced to the image pickup device CCD1 in a time series. When each liquid crystal shutter serves also to perform the function of a stop, the light amount may be controlled by setting the transmittance of the liquid crystal shutter in the open state to a certain level between the maximum value and the minimum value.

Alternatively, similar control of the light amount can be effected by controlling periods of time during which the liquid crystal shutter is opened and closed. In the case of using the liquid crystal shutter to control the light amount depending on changes in brightness of the subject, the stop SP can be omitted.

In this Embodiment 3, the incident angle of the light beam upon the liquid crystal shutter is greater than that in above Embodiments 1 and 2. Therefore, the liquid crystal shutter is required to have a smaller change in angle characteristic of the extinction ratio than in above Embodiments 1 and 2.

With this Embodiment 3, since a reflecting type liquid crystal shutter is used, the polarizing plate and the ¼-wavelength plate can be shared by both the entrance side and the emergent side, thus resulting in a reduced apparatus size and a simplified construction.

Embodiment 3 shown in FIG. 9 is the same as Embodiment 1 shown in FIG. 1 except for the construction and placement of the liquid crystal shutter, and performs the zooming and focusing operation in a similar way.

With Embodiment 3 shown in FIG. 9, since the image superimposing means and the liquid crystal shutters are constructed as a single integral member, a reduced apparatus size and a simplified construction can be realized.

Additionally, when it is desired to effect further adjustment of the light amount in Embodiment 3, an ND filter may be disposed between the triangular-pillar prism STP and the image pickup device CCD1 in such a way being able to advance and retreat.

Figure 11:
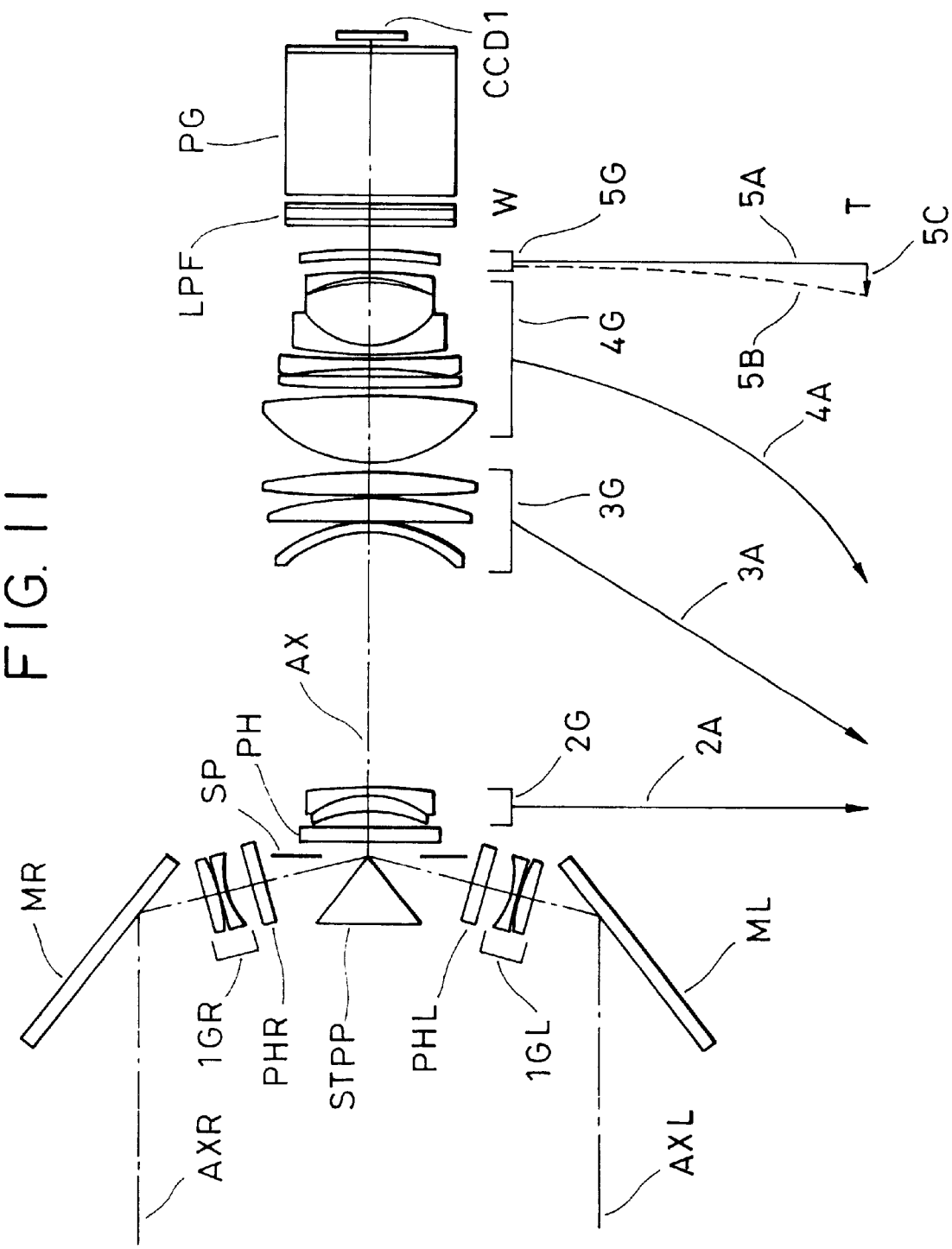
FIG. 11 is an optically depicted sectional view of a shooting optical system of Embodiment 4.

FIG. 11 is a sectional view of a shooting optical system of Embodiment 4 of the present invention. Embodiment 4 has the same construction as Embodiment 1 shown in FIG. 1 except that a liquid crystal shutter serving as the light amount control means is made up of a plurality of members instead of using the left and right liquid crystal shutters SL, SR. Specifically, in this embodiment, two left and right filters PHL, PHR each comprising an integral unit of a ¼-wavelength plate and a polarizing plate are disposed respectively between first lens groups 1GL, 1GR and a superimposing optical element (triangular—pillar prism) STPP, liquid crystal layers are formed on surfaces of the superimposing optical element STPP, and a filter PH comprising an integral unit of a polarizing plate and a ¼-wavelength plate is disposed between a second lens group 2G and the superimposing optical element STPP.

The shooting optical system of FIG. 11 comprises two left and right reflecting mirrors ML, MR for causing a deviation of, respectively, two left and right optical axes AXL, AXR inward, that are arranged substantially parallel to each other with a spacing almost equal to the eye-to-eye distance of human beings; two left and right first lens groups 1GL, 1GR each having negative refractive power; two left and right filters PHL, PHR each comprising an integral unit of a ¼-wavelength plate and a polarizing plate; a triangular-pillar prism STPP that has two left and right reflecting surfaces with liquid crystal layers formed thereon and that is disposed near the position of a stop SP of the shooting optical system for superimposing the two left and right optical axes AXL, AXR with each other; and a filter PH comprising an integral unit of a polarizing plate and a ¼-wavelength plate. The shooting optical system further comprises a second lens group 2G held always stationary with respect to an image focused plane (image pickup device CCD1) and having weak negative refractive power as a whole; a third lens group 3G that is movable on an optical axis from the image focused plane side to the subject side in the zooming operation ranging from the wide-angle end to the telephoto end and that has positive refractive power as a whole; a fourth lens group 4G that is movable on the optical axis for correcting the position of the image focused plane varied depending on the zooming operation ranging from the wide-angle end to the telephoto end and which has positive refractive power as a whole; a fifth lens group 5G movable on the optical axis depending on changes of the distance to a subject and having positive refractive power as a whole; an optical low-pass filter (LPF); a color separating prism PG; and an image pickup device CCD1 (having a light receiving surface aligned with the image focused plane). The image pickup device CCD1 represents an image pickup device, such as a CCD, which takes in images periodically.

Figure 12:
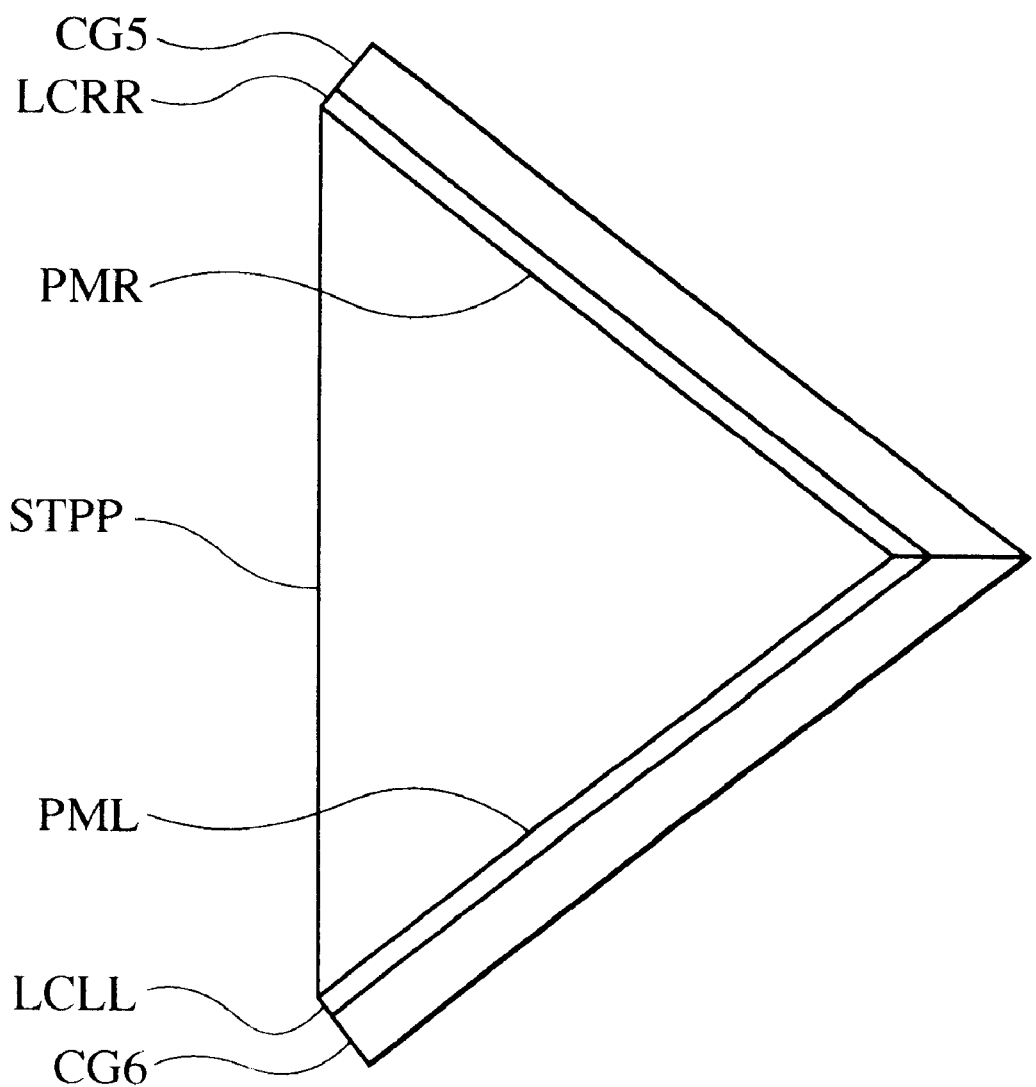
FIG. 12 is an optically depicted sectional view of a triangular—pillar prism having a liquid crystal layer used in Embodiment 4.

The triangular-pillar prism STPP having the two left and right reflecting surfaces with liquid crystal layers formed thereon includes, as shown in FIG. 12, a liquid crystal layer LCRR formed on a right-side reflecting surface PMR of the triangular-pillar prism STPP; a cover glass CG5 covering the liquid crystal layer LCRR; a liquid crystal layer LCLL formed on a left-side reflecting surface PML of the triangular-pillar prism STPP; and a cover glass CG6 covering the liquid crystal layer LCLL. Transparent electrodes are provided on a surface of the cover glass CG5 (CG6) facing the liquid crystal layer LCRR (LCLL). The reflecting surfaces PMR, PML of the triangular-pillar prism STP also serve themselves as electrodes.

Thus, a liquid crystal shutter is constructed by a combination of the liquid crystal layer LCLL (LCRR) formed on each of the left and right surfaces of the triangular-pillar prism STPP, the filter PHL (PHR) disposed on the entrance side of the triangular-pillar prism STPP and comprising an integral unit of a ¼-wavelength plate and a polarizing plate, and the filter PH disposed on the emergent side of the triangular-pillar prism STPP and comprising an integral unit of a polarizing plate and a ¼-wavelength plate. By independently energizing the liquid crystal layers formed on the left and right reflecting surfaces of the triangular-pillar prism STPP in a switching manner, the transmittances of left and right optical paths are alternately increased and decreased so that images having left and right parallaxes are alternately introduced to the image pickup device CCD1 in a time series.

When the liquid crystal shutter serves also to perform the function of a stop, the light amount may be controlled by setting the transmittance of the liquid crystal shutter in the open state to a certain level between the maximum value and the minimum value.

Alternatively, similar control of the light amount can be effected by controlling periods of time during which the liquid crystal shutter is opened and closed.

In the case of using the liquid crystal shutter to control the light amount depending on changes in brightness of the subject, the stop SP can be omitted.

With this Embodiment 4, since only the liquid crystal layer of the liquid crystal shutter is formed on the reflecting surface of the triangular-pillar prism STPP and the polarizing plate is provided separately from the triangular-pillar prism STPP, the incident angle of the light beam upon the polarizing plate can be made smaller. Accordingly, angle-dependent changes in the extinction ratio of the liquid crystal shutter can be reduced in comparison with those in above Embodiment 3, and the amount of light leaked over the entire light receiving surface of the image pickup device can be reduced when the liquid crystal shutter is in the light cutoff state.

In this Embodiment 4, the incident angle of the light beam upon the liquid crystal layer is greater than that in above Embodiments 1 and 2. Therefore, a liquid crystal exhibiting a smaller change in characteristic depending on the incident angle than in above Embodiments 1 and 2 is required.

Figure 13:
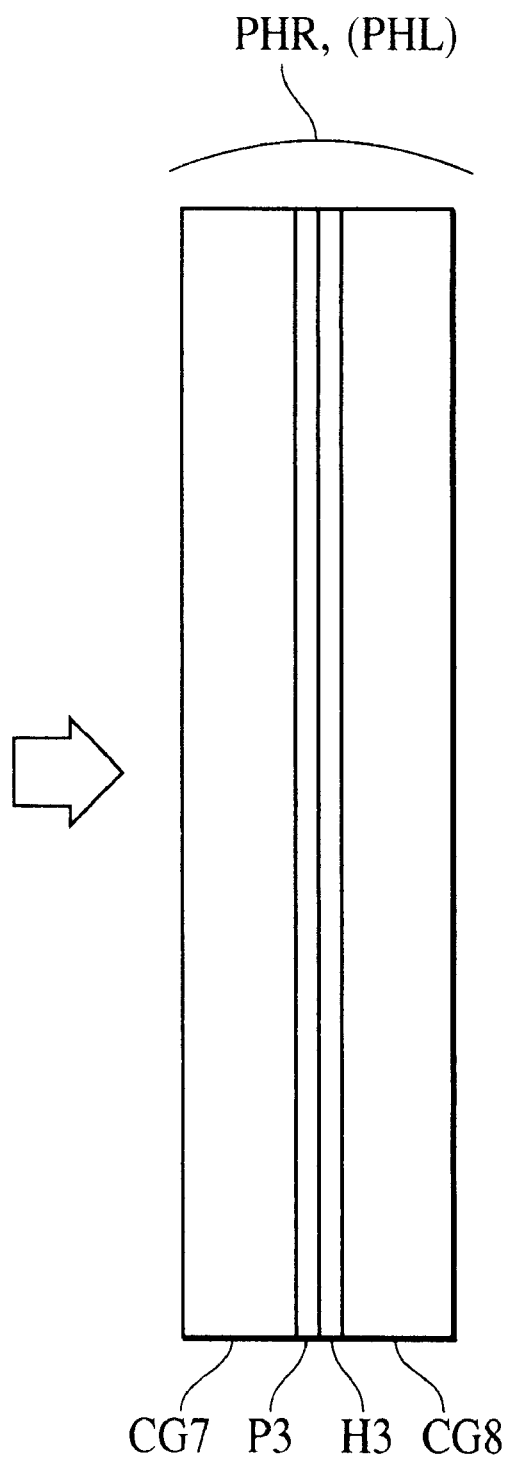
FIG. 13 is an optically depicted sectional view of a filter PHR (PHL) used in Embodiment 4.

FIG. 13 is a sectional view showing details of the filter PHR (PHL) used in Embodiment 4 shown in FIG. 11.

The filter PHR (PHL) comprises a cover glass CG7, a ¼-wavelength plate P3, a polarizing plate H3, and a cover glass CG8, which are arranged in this order from the side closer to the subject. The optical axis of the ¼-wavelength plate P3 and the polarization axis of the polarizing plate H3 are set to cross each other at 45 degrees.

Figure 14:
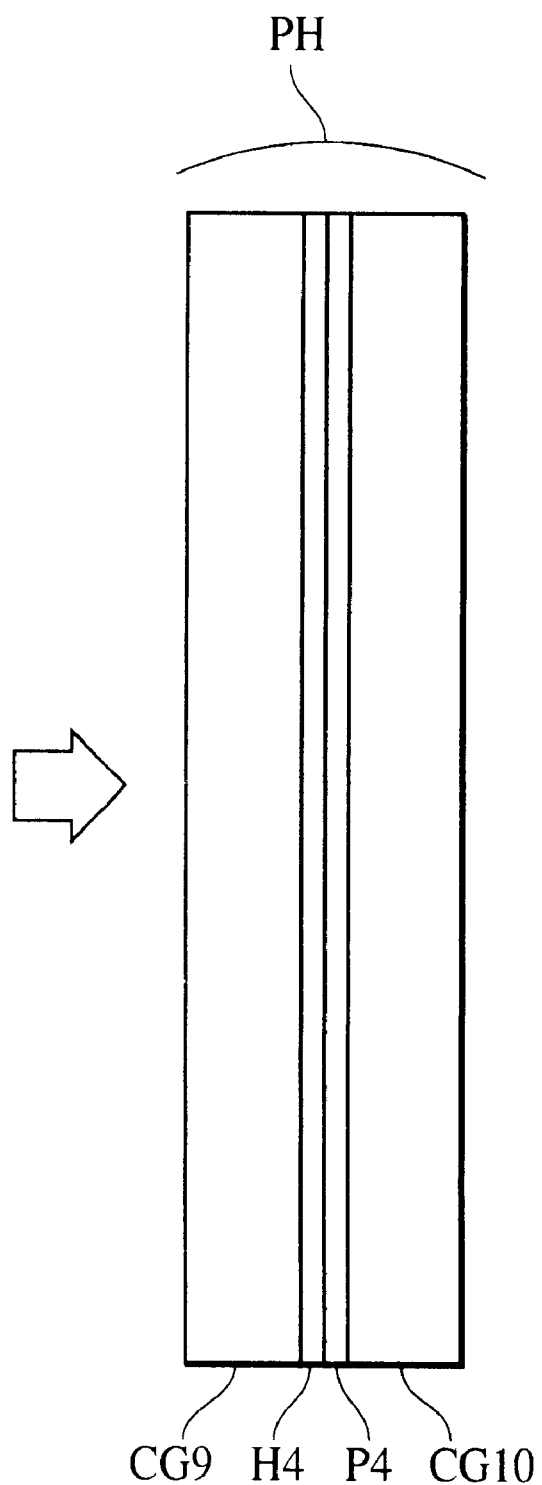
FIG. 14 is an optically depicted sectional view of a filter PH used in Embodiment 4.

FIG. 14 is a sectional view showing details of the filter PH used in Embodiment 4 shown in FIG. 11. The filter PH comprises a cover glass CG9, a polarizing plate H4, a ¼-wavelength plate P4, and a cover glass CG10, which are arranged in this order from the side closer to the subject. The optical axis of the ¼-wavelength plate P4 and the polarization axis of the polarizing plate H4 are set to cross each other at 45 degrees so that a light having passed the liquid crystal shutter becomes a circularly polarized light.

Since the ¼-wavelength plates are arranged on the subject side and the image pickup (device) side of the polarizing plates of each liquid crystal shutter, it is possible to prevent not only changes in luster of the subject due to polarization, but also the occurrence of moiré due to a reduction of the effect of the quartz low-pass filter caused by polarization. As a result, a natural image can be taken.

Also, with the ¼-wavelength plates arranged on both the sides of the liquid crystal shutter, a linearly polarized light passing the liquid crystal shutter becomes a circularly polarized light on both the subject side and the image pickup side. This arrangement is therefore effective in reducing the influence of the subject having a polarization characteristic and in suppressing the reduction of the effect of the quartz low-pass filter that is used to separate a light beam based on double refraction.

Embodiment 4 shown in FIG. 11 is the same as Embodiment 1 shown in FIG. 1 except for the construction and placement of the liquid crystal shutter including the liquid crystal layer, the polarizing plate and the ¼-wavelength plate, and performs the zooming and focusing operation in a similar way.

With Embodiment 4 shown in FIG. 11, since the image superimposing means and parts of the liquid crystal shutters are constructed as an integral member, a reduced apparatus size and a simplified construction can be realized.

Additionally, when it is desired to effect further adjustment of the light amount in Embodiment 4, an ND filter may be disposed between the triangular-pillar prism STPP and the image pickup device CCD1 in such a way to be able to advance and retreat.

In any of above Embodiments 1 to 4, preferably, the polarization axis of the polarizing plate and the optical axis of the ¼-wavelength plate are set to cross each other at 45 degrees to produce a circularly polarized light, and the polarization axes of the two polarizing plates used in the liquid crystal shutter are set to an angle at which a maximum extinction ratio is obtained.

Generally, the maximum extinction ratio is obtained by setting the polarization axes of the two polarizing plates parallel to each other when a ferroelectric liquid crystal is employed, and by setting the polarization axes of the two polarizing plates perpendicular to each other when a twisted nematic liquid crystal is employed.

Figure 4:
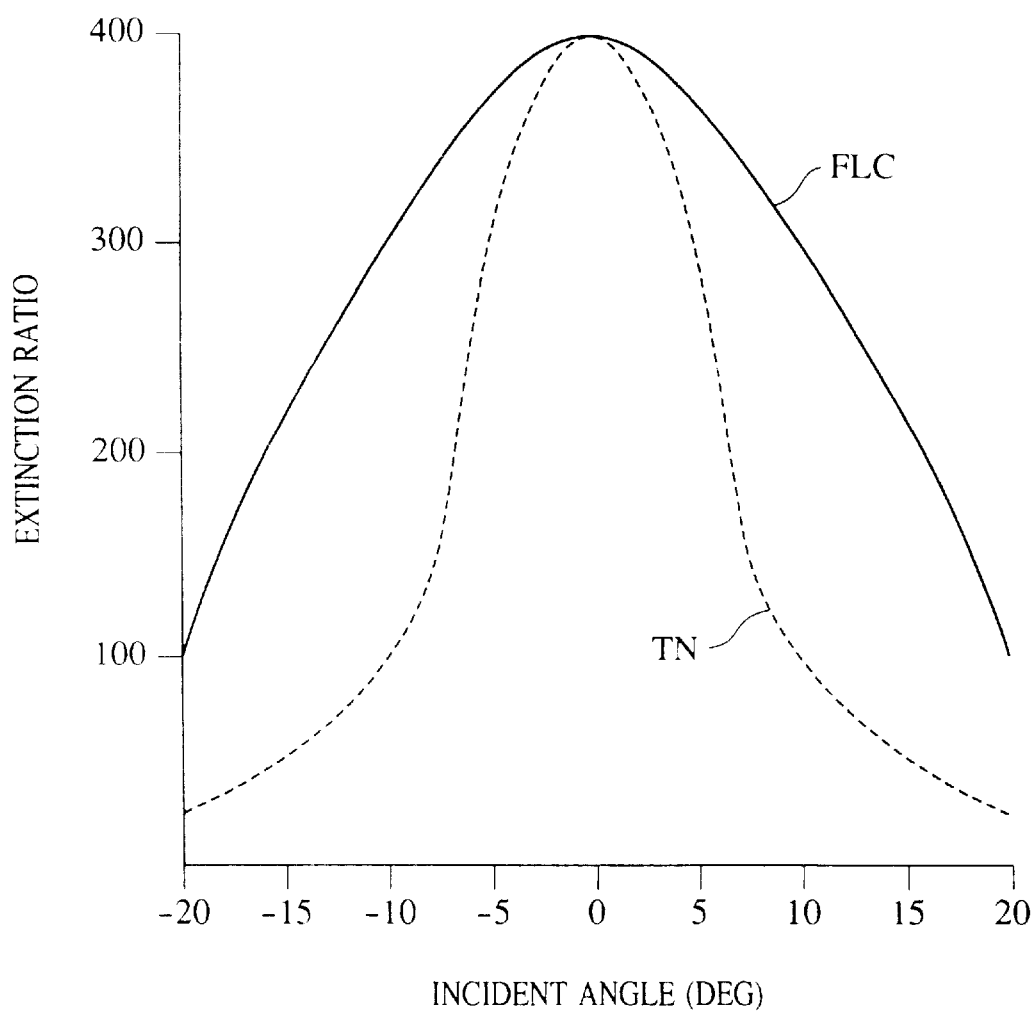
FIG. 4 is a graph showing angle characteristics of the extinction ratio of general liquid crystal shutters.

Moreover, from the result of the angle characteristic of the extinction ratio shown in FIG. 4, it is preferable that a liquid crystal of the liquid crystal shutter used in the three-dimensional image shooting optical system and the three-dimensional image shooting apparatus of the present invention be a ferroelectric liquid crystal exhibiting smaller changes in angle characteristic of the extinction ratio.

According to the four embodiments described above, an optical system for shooting a three-dimensional image and a three-dimensional image shooting apparatus using the optical system are achieved that can reduce the amount of light leaked from the side to be cut off over the entire image frame when parallax images are obtained by employing a liquid crystal shutter, which can suppress the occurrence of monochromatic moiré and color moiré and which can easily produce parallax images enabling a subject to be imaged with a natural luster.

Further, since the liquid crystal shutter is disposed in a position where the incident angle of an off-axis light beam is relatively small, light leakage from the liquid crystal shutter is reduced. Also, since ¼-wavelength plates are arranged on both the sides of the liquid crystal shutter, it is possible to prevent not only changes in the luster of the subject due to polarization, but also the occurrence of moiré due to the reduction of the effect of a quartz low-pass filter caused by polarization. As a result, a natural image can be taken.

In addition, arranging the liquid crystal shutter in a position of the shooting optical system, at which the effective diameter is relatively small, provides such advantages that the overall apparatus construction is downsized and simplified.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical system for shooting a three-dimensional image, comprising:

a pair of front optical components each having negative optical power;

an optical member for superimposing optical axes of said pair of front optical components with each other;

a rear optical component disposed to have an optical axis aligned with said superimposed optical axes; and a shutter capable of independently controlling the amount of transmitted light incident upon said pair of front optical components from an object, said shutter being disposed between said pair of front optical components and said rear optical component, said optical system forming parallax images in a time series by alternately changing the amount of transmitted light incident upon said pair of front optical components from the object with said shutter.

2. An optical system according to claim 1, wherein said shutter is provided in a pair and disposed between said pair of front optical components and said optical member.

3. An optical system according to claim 2, wherein said shutter alternately changes the amount of transmitted light incident upon said pair of front optical components from the object by changing the amount of transmitted light incident upon one of said pair of front optical components from the subject and the amount of transmitted light incident upon the other of said pair of front optical components from the subject in terms of a light transmitting area.

4. An optical system according to claim 1, wherein said shutter is disposed between said optical member and said rear optical component.

5. An optical system according to claim 1, wherein said shutter is disposed on a reflecting surface of said optical member.

6. An optical system according to claim 1, wherein said shutter is a liquid crystal shutter.

7. An optical system according to claim 6, wherein a ¼-wavelength plate is disposed on at least one of the object side and the image focused plane side of said shutter.

8. An optical system according to claim 1, further comprising a stop at or near a position where the optical axes of said pair of front optical components cross each other.

9. An optical system according to claim 1, wherein said optical member is a triangular-pillar prism having two reflecting surfaces, and the optical axes of said pair of front optical components and the optical axis of said rear optical component cross each other at a ridgeline defined by said two reflecting surfaces.

10. An optical system according to claim 1, wherein said rear optical component includes a plurality of lens units movable in a direction of the optical axis for zooming.

11. An apparatus for shooting a three-dimensional image, comprising:

an optical system according to claim 1; and an image pickup device disposed on an image focused plane of said optical system.

\* \* \* \* \*

UNITED STATES PATENT AND TRADEMARK OFFICE
CERTIFICATE OF CORRECTION

PATENT NO.    : 6,363,225 B1                                              Page 1 of 1
DATED         : March 26, 2002
INVENTOR(S)   : Saburo Sugawara It is certified that error appears in the above-identified patent and that said Letters Patent is hereby corrected as shown below:

<u>Column 1,</u>
Line 40, "deteriorate" should read -- deteriorates --.

<u>Column 2,</u>
Line 55, "a" should read -- an --.

<u>Column 3,</u>
Line 1, "embodiments( with" should read -- embodiments (with --.

<u>Column 5,</u>
Line 42, "group" should read -- groups --.

<u>Column 6,</u>
Line 53, "b" should be deleted.

<u>Column 9,</u>
Line 23, "reflectance" should read -- reflectances --.

Signed and Sealed this

Fifteenth Day of October, 2002

*Attest:*

JAMES E. ROGAN
*Attesting Officer*         *Director of the United States Patent and Trademark Office*